Dec. 24, 1957  W. P. UHLER  2,817,545
VALVE STEM SEAL
Filed Dec. 30, 1949
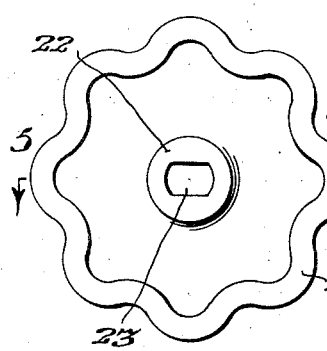
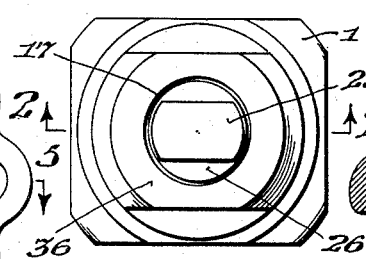
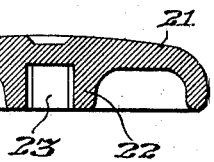
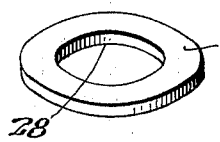
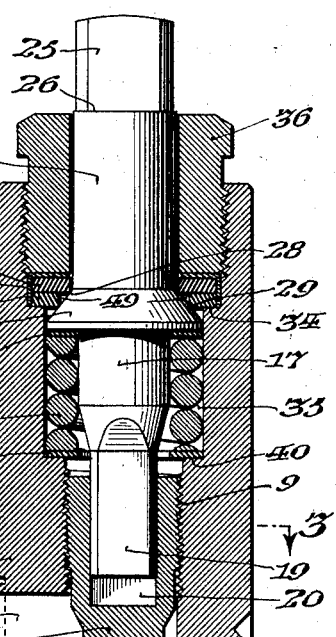
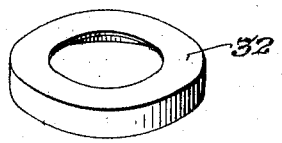
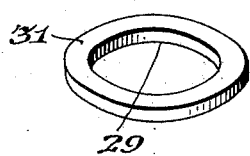
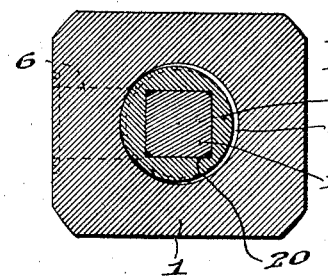
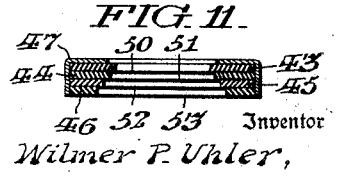
Inventor
Wilmer P. Uhler,
By Clifton C. Hallowell
Attorney United States Patent Office 2,817,545
Patented Dec. 24, 1957

2,817,545

VALVE STEM SEAL

Wilmer P. Uhler, Tottenville, N. Y., assignor to S. S. White Dental Manufacturing Company, a corporation of Pennsylvania Application December 30, 1949, Serial No. 136,071

8 Claims. (Cl. 286—11.12)

My invention relates particularly to that type of valves that may be classified as plug controlled valves, and is especially directed to the means employed to prevent accidental escape of the fluid to be controlled thereby.

While valves of the type herein contemplated have in the past performed with reasonable satisfaction, it has been recognized that they have had some shortcomings that have been found difficult to overcome.

I have devised a relatively simple means of improving the valve construction in such a manner that the fatigue life or the number of cycles through which the valve would normally operate before failure of its cooperative component parts, may be considerably extended, which is an advantage that may be considered to be the principal object of my invention.

Another highly important object of my invention is to so form and to correlate the relatively cooperative valve parts that the torque required to rotate the valve stem under the full high gas pressure is reduced to a minimum.

A further object of my invention is to provide a high pressure valve in which its cooperative parts are so constructed and arranged as to be capable of operating without the employment of lubricant and without consequent detrimental effect on said parts, yet affording a novel receptacle for containing lubricant in event lubricant may be considered to be desirable.

My invention further contemplates a composite leak-proof washer or gland composed of a plurality of annular gland disks or rings alternately of relatively hard and soft texture respectively and collectively maintained as a unit assembly.

The form of my invention as hereinafter more definitely specified, comprehends a valve body having a valve chamber connected with inlet and outlet passageways that are arranged to be controlled by a curvedly tapered valve-plug movable axially toward and from a relatively cooperative valve-seat of similar contour, and arranged to be actuated by a rotatable valve-stem having a conoidal flange bearing against the innermost edges of a plurality of annular gland-rings having cylindriform bores of relatively different diameters, and respectively composed of material of relatively different hardness with consequent wear and pressure resistant qualities.

My invention also includes all of the various novel features of construction and arrangement as hereinafter more definitely specified.

In the accompanying drawings, Figure 1 is an enlarged plan view of a valve constructed in accordance with my invention; Fig. 2 is an enlarged transverse central vertical sectional view of said valve taken on the line 2—2 in Fig. 1, certain parts being shown in elevation for convenience of illustration; Fig. 3 is a horizontally disposed transverse sectional view of said valve taken on the line 3—3 in Fig. 2; Fig. 4 is an inverted plan view of the normally separable hand-wheel wrench by which the valve-stem may be operated to open or close the valve, said hand-wheel wrench being shown of actual dimensions; Fig. 5 is a transverse vertical sectional view of the hand-wheel wrench shown in Fig. 4 taken on the line 5—5 in said figure; Fig. 6 is a perspective view of the upper gland-ring shown in Fig. 2; Fig. 7 is a perspective view of the lower gland-ring shown in Fig. 2; Fig. 8 is a perspective view of the shell or jacket in which the gland-rings may preferably be encased, as shown in Figs. 2 and 11; Fig. 9 is a perspective view of one of the washers against which the opposite ends of the valve-stem spring bears; Fig. 10 is a perspective view of the reinforcing bushing which is embedded in the lower region of the valve-seat bore; and Fig. 11 is a transverse vertical sectional view of a modification of the packing ring assembly shown in Fig. 2 and embodying a plurality of gland-rings in laminated relation.

In said figures, the valve body 1 is provided with the depending screw threaded extension or inlet spud 2 by which it may be attached to a gas cylinder or other container for gas in a well known manner.

The valve chamber 3 which connects the inlet passageway 5 entering through the screw threaded spud 2 with the outlet passageway 6 discharging laterally through the side wall of the valve body and arranged to be connected by a yoke of well known construction, with a gas conveying tube, not shown, leading to its source of utility.

The valve-plug 7 is in screw threaded engagement with the upwardly extending screw threaded bore 9 of the valve chamber 3 and is provided with the curvedly tapering depending nose 10 which may be advanced by rotation from the position shown, to engage the outwardly flaring surface 11 of the tubular valve plug seat 12 which may be preferably formed of nylon and its relatively restricted bore 13 reinforced by the bushing 15 disposed in its lowermost region, and which is securely anchored in said valve body by the radially extending flange 16.

Rotation of the valve-plug 7 to effect opening and closing of the inlet passageway 5 is effected by rotation of the valve-stem 17 the lower end region of which is relatively reduced in diameter and squared to provide the key 19 which projects into a similarly squared key socket 20 in said valve-plug 7 so that when said valve-stem 17 is rotated the valve-plug 7 by reason of its threaded connection slides axially on said key either down or up depending upon the direction of rotation of said valve-stem.

The valve-stem 17, as shown in Figs. 1 and 2 may be manually operated by the normally separate hand-wheel wrench 21 shown in Figs. 4 and 5, having the depending centrally disposed boss 22 which is provided with the laterally elongated socket 23 arranged to be fitted to the similarly shaped stud 25 extending upwardly and forming the upper extremity of the valve-stem 17 and providing the shoulder 26 upon which the boss 22 of the hand-wheel wrench 21 may rest when thus engaged to effect rotation of said valve-stem 17 and the consequent axial movement of the valve-plug 7.

As illustrated in Fig. 2 the valve-stem 17 is provided intermediate of its length with the conoidal flange 27 against the upper conoidal surface of which the inner lower edges 28 and 29 of the gland-rings 30 and 31, in the form of annular disks, also shown in Figs. 6 and 7, bear to provide a gas tight seal. Said gland-rings are preferably composed of nylon of relatively different hardness and are encased in the annular shell or jacket 32, shown in Figs. 2 and 8, to form the composite gland packing assembly which is arranged to be tightly engaged with the shoulder 34 in the spring chamber 35 by the gland-nut 36, which also provides a closure cap for the valve parts.

Again referring to Fig. 2, the valve-stem 17 is maintained uplifted to press the conoidal surface of its flange 27 into gas tight relation with the lower inner edges 28 and 29 of the gland-rings 30 and 31 by the coiled spring 37 which bears at its opposite ends against the washers 38 and 39 respectively, which washers may preferably be formed of nylon to afford ideal slipping surfaces for the spring terminals and avoiding undesirable metal to metal contact with said spring terminals. The washer 38 is disposed between the upper spring end and the plane under surface of the flange 27 and the washer 39 disposed between the lower spring end and the annular shoulder 40 at the base of the spring chamber 35.

It may be best noted here that the introduction of the nylon washers 38 and 39 avoids relative rotation in direct contact of the spring 37 and shoulder 39 or of the spring 37 and flange 27, but tends to force relative rotation between the upper end of the spring 37, the nylon washer 38 and the flange 27 or between the lower end of the spring 37, and the nylon washer 39 and the shoulder 40. This is a very desirable improvement in valve construction as it prevents galling in the threads of the valve-plug 7 by any possible chips or flakes that may be abraded off incident to metal to metal contact of said parts under high pressure.

As shown in the modification illustrated in Fig. 11, the laminated gland-ring assembly is composed of a plurality of annular gland-rings 43, 44, 45 and 46 encased in the shell or jacket 47 to provide the composite gland-ring structure therein illustrated, said gland-rings having their inner cylindrical diameters progressively increasing downwardly so that their inner lower angled edges 50, 51, 52 and 53 respectively conform to the conoidal surface of the flange 27 shown in Fig. 2 at a respective circular line of contact therewith, and with said circular lines spaced along the conoidal surface.

Said gland-rings 43, 44, 45 and 46 may preferably be formed of nylon and be alternately composed of relatively hard and soft texture, for instance, the gland-rings 43 and 45 should be of hard consistency while the gland-rings 44 and 46 are relatively soft.

It may be here noted that when the gas pressure is high the contact between the conoidal surface of the valve-stem flange 27 and gland-rings 30 and 31 is sufficient to insure a gas tight seal with a variety of hard materials that may be employed to provide gland-rings. At the lower pressures, however, as the gas is withdrawn from the gas cylinder or container, leaks have been found to occur when relatively hard materials alone were employed, due to sight misalignment or irregularities in machining of the valve-stem structure, sufficient to cause lack of proper sealing.

In order to have the working parts of the valve function satisfactorily from the time that the gas cylinder or container is full and throughout its discharge, it is found necessary to restort to the use of a relatively soft or pliant gland-ring material so that the spring pressure alone will be sufficient to maintain a tight seal under all conditions of pressure.

The use of such a soft material, however, has been found to be objectionable when used alone for the reason that when the valve is operated extensively with gas pressures up to two thousand pounds per square inch, the frictional effects between the conoidal flange 27 and the gland-rings become greater than the shear strength of the material employed, thus causing it to flow or break down by spreading, thereby not only inviting leaks but substantially increasing the torque necessary to rotate the valve-stem.

Many materials have been employed for gland-ring packings but none has been found embodying sufficient resilience, low enough coefficient of friction and sufficiently high shear strength to perform satisfactorily.

With the above difficult conditions noted, it was deemed expedient to employ a laminated composite gland-ring wherein the alternate laminations are of relatively different hardness, so that the harder gland-ring 30 tends to support the pressure thrust of the valve-stem 17 and its conoidal flange 27 against the lower inside edge 28 of said gland-ring 30 of the composite gland structure, while the softer gland-ring 31 tends to form the seal that prevents leakage.

As shown in Fig. 2, the gland is composed of but two laminations, the harder lamination being designated as 30 and the softer lamination being designated as 31. However, it may be found to be desirable in some instances to provide a plurality of gland-ring laminations, as illustrated in the modified form in Fig. 11, wherein the laminations 43 and 45 may be relatively harder than the laminations 44 and 46, the inner edges of the harder laminations 43 and 45 supporting the thrust of the valve-stem 17 while the softer laminations 44 and 46 insure the seal against leakage.

It will be obvious that by reason of the fact that the conoidal surface of the valve-stem flange 27 bears only on the inner angled free edges of the gland-ring laminations, the torque required to rotate the valve-stem 17 is reduced to a minimum without the employment of a lubricant; however, ample space is provided by the annular triangular void 49 for the introduction and retention of lubricant if it may be determined to be desirable.

My invention is particularly advantageous in that by the construction contemplated there is no excessive thrust on the threads of the valve-plug during its opening or closing operation and therefore the wear on said threads is reduced to a minimum and the torque required to actuate said valve-plug is likewise reduced, which lends the further advantage of employing a plating of tin upon the surface of said valve-plug.

I do not desire to limit my invention to the precise details of construction and arrangement as herein set forth, as it is obvious that various modifications may be made therein without departing from the essential features of my invention as defined in the appended claims.

Having thus described my invention, I claim:

1. In a high pressure valve comprising a valve body having a bore with threaded inner and outer portions of different diameters and including an annular pocket located between said threaded portions, a composite gasket removably disposed in said pocket and constituted of a plurality of annular disks composed of nylon alternately of different wear resisting qualities and having inner cylindriform surfaces progressively of different diameters for providing free angled inner edges, and a valve stem rotatably disposed in said bore and having a conoidal bearing surface cooperatively engaged with the free angled inner edges of the plurality of disks and in sealing cooperation with each disk whereby to afford a high pressure seal for preventing leakage through said bore.

2. In a high pressure valve comprising a valve body including a bore and having a pocket intermediate its ends, and a gasket retainer; a composite gasket removably disposed in said pocket and held by said retainer and consisting of a plurality of resilient annular disks disposed normal to the axis of said bore and alternately composed of nylon of different hardnesses and having inner cylindriform surfaces progressively of different diameters for presenting a free angled edge on each disk, said gasket retainer comprising an annular cupped jacket; a valve stem rotatably disposed in said bore and having a conoidal bearing surface cooperatively engaged with the free angled inner edge of each of the respective disks; and resilient means effective to axially thrust said conoidal bearing surface into engagement with the inner angled edges of said disks.

3. A housing structure having a bore extending therethrough and including a recess, a composite gasket disposed in said recess and comprising a plurality of washer-like gland-rings formed of nylon and having their inner cylindrical surfaces at right angles to their radial faces such that spaced right-angled edges are present on adjacent rings, said rings being progressively of different diameters and alternately of different hardnesses, and a stem rotatably disposed in said bore and having a conoidal bearing surface cooperatively engaging the relatively spaced inner right-angled edges of said rings.

4. In a high pressure valve, a housing structure having a passageway extending therethrough, a valve stem rotatably disposed in said passageway and having a conoidal bearing surface, gasket retaining means in said passageway, a gasket retained therein comprising a plurality of washer-like resilient gland-rings having their inner cylindrical surfaces progressively of different diameters and alternately of yielding material of different hardnesses for presenting on each gland-ring a free angled inner edge and affording on the plurality of gland-rings stepped angled edges conforming to said conoidal bearing surface and each cooperatively engaged with said conoidal bearing surface at a circular line of contact with the said circular lines of the plurality of gland-rings spaced along said conoidal surface.

5. In a valve for controlling the flow of fluids under high pressure and comprising a valve body having a bore, a rotatable valve stem in said bore and having a flange with a conoidal surface; a gasket assemblage cooperative with the said conoidal surface, said assemblage including flat rings disposed in laminated formation and alternately composed of hard and soft nylon with the inner cylindrical surface of each ring meeting a radial surface of an adjacent ring at a circular line outward of the inner peripheral surface of the adjacent ring so that the ring assemblage has a stepped cross-section with each ring having an inner sharp edge for engaging the said conoidal surface and so that the assemblage provides a series of annular voids closed by said conoidal surface and susceptible of receiving lubricant, said bore having a ledge defining a pocket for receiving the rings, a closure plug for the valve body effective for retaining the rings upon said ledge, and a spring acting upon the rotatable stem for axial pressure thereon tending to thrust said conoidal flange surface into operative contact with the said sharp edge of each of said rings.

6. In a valve for controlling the flow of fluids under high pressure and comprising a valve body having a bore, a rotatable valve stem in said bore and having a flange with a conoidal surface; a gasket assemblage cooperative with the said conoidal surface, said assemblage including flat rings disposed in laminated formation and alternately composed of hard and soft nylon with the inner peripheral surface of each ring meeting a radial surface of an adjacent ring at a circular line outward of the inner peripheral surface of the adjacent ring so that the ring assemblage has a stepped cross-section with each ring having an inner sharp edge for engaging the said conoidal surface and so that the assemblage provides a series of annular voids closed by said conoidal surface and susceptible of receiving lubricant, said bore having a ledge defining a pocket for receiving the rings, a closure plug for the valve body effective for retaining the rings upon said ledge, a cupped receptacle enclosing said rings having a portion between the rings and the closure plug, and a spring acting upon the rotatable stem for axial pressure thereon tending to thrust said conoidal flange surface into operative contact with the said sharp edges of each of said rings.

7. In a valve for controlling the flow of fluids under high pressure and comprising a valve body having a bore, a rotatable valve stem in said bore and having a flange with a conoidal surface; a gasket assemblage cooperative with the said conoidal surface, said assemblage including flat rings disposed in laminated formation and alternately composed of hard and soft nylon, said rings being disposed normal to the axis of said valve stem and presenting right-angled edges against the conoidal surface of said flange along relatively parallel circular lines, so that the assemblage provides a series of annular voids of angular section closed by said conoidal surface and susceptible of receiving lubricant.

8. In a high pressure valve comprising a valve body providing a housing including a pocket; a gasket disposed in said pocket and composed of a plurality of washer-like rings formed of nylon and having inner cylindrical surfaces progressively of different diameters with inner sharp right-angled edges of progressively different diameters, the adjacent rings being of materials of different hardnesses, and a valve stem in said housing and having a conoidal bearing surface cooperatively engaged with the sharp right-angled edges of said rings along relatively spaced circular lines.

References Cited in the file of this patent

UNITED STATES PATENTS

| Number | Name | Date |
|---|---|---|
| 745,482 | Connelly | Dec. 1, 1903 |
| 1,012,067 | Emrick | Dec. 19, 1911 |
| 1,522,075 | Penrod et al. | Jan. 6, 1925 |
| 1,548,018 | Angell | Aug. 4, 1925 |
| 1,609,340 | Wilson | Dec. 7, 1926 |
| 1,631,586 | Forbes | June 7, 1927 |
| 2,062,422 | Meese | Dec. 1, 1936 |
| 2,236,370 | Jackman | Mar. 25, 1941 |
| 2,252,554 | Carothers | Aug. 12, 1942 |
| 2,485,092 | Gannon | Oct. 18, 1949 |
| 2,520,092 | Fredrickson et al. | Aug. 22, 1950 |

OTHER REFERENCES

"Handbook on Plastics," Simonds and Ellis, in Div. 38, Patent Office.